US008238748B2

(12) United States Patent
Kuri et al.

(10) Patent No.: US 8,238,748 B2
(45) Date of Patent: Aug. 7, 2012

(54) METHOD FOR WAVELENGTH ASSIGNMENT IN A WDM NETWORK

(75) Inventors: Josué Kuri, San Bruno, CA (US); Steven Joseph Hand, San Jose, CA (US); Rajasekar Venkatesan, Bangalore (IN); Jayaram Hanumanthappa, Bangalore (IN); Maneesh Jain, Dehradun (IN); Shyamtanu Majumder, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 621 days.

(21) Appl. No.: 12/344,110

(22) Filed: Dec. 24, 2008

(65) Prior Publication Data

US 2010/0158529 A1 Jun. 24, 2010

(51) Int. Cl.
*H04J 14/00* (2006.01)
(52) U.S. Cl. ............. 398/68; 398/66; 398/69; 398/57; 398/58

(58) Field of Classification Search ............ 398/79, 398/43, 57, 66, 69, 68, 58
See application file for complete search history.

(56) References Cited

U.S. PATENT DOCUMENTS

| | | | | | |
|---|---|---|---|---|---|
| 5,999,288 | A | * | 12/1999 | Ellinas et al. | 398/59 |
| 2008/0155537 | A1 | * | 6/2008 | Dinda et al. | 718/1 |

* cited by examiner

*Primary Examiner* — M. R. Sedighian
(74) *Attorney, Agent, or Firm* — Bradford Goodson; David L. Soltz

(57) ABSTRACT

In accordance with the present disclosure, a method of configuring a wavelength division multiplexed (WDM) network is presented. The WDM network includes circuits that carry optical signals, with each signal corresponding to a wavelength. The WDM network includes nodes, with links connecting the nodes to one another. Each circuit includes at least one link and at least one node. The method comprises assigning each of the circuits to an optical signal, based on first and second criteria, and configuring the nodes based on the assignment.

10 Claims, 3 Drawing Sheets

METHOD FOR WAVELENGTH ASSIGNMENT IN A WDM NETWORK

BACKGROUND

In a wavelength division multiplexed (WDM) network, optical signals may be switched from one optical communication link to another. In order to achieve such switching, the optical signals are often received from a first optical link at a node and converted to electrical signals. The electrical signals are then used to generate further optical signals, which are supplied to a second optical link connected to the node.

An alternative approach involves all-optical switching, whereby optical signals are received from one or more links at a node, and directed to corresponding output links at the node without optical-to-electrical conversion. Because there is no optical-to-electrical conversion at the node, it may be difficult to convert a signal on a circuit to a different wavelength at the node. Accordingly, a circuit must have the same wavelength assigned along each link in its path. In addition, any circuits traversing a particular link in the network must each be assigned a different wavelength. Moreover, wavelength availability may depend on factors other than the above-noted constraints. For example, certain transmitters may be less expensive than others.

Accordingly, there is a need for an optimal wavelength assignment method that takes into account multiple parameters.

SUMMARY

In accordance with the present disclosure, a method of configuring a wavelength division multiplexed (WDM) network is presented. The WDM network includes circuits that carry optical signals, with each signal corresponding to a wavelength. The WDM network includes nodes, with links connecting the nodes to one another. Each circuit includes at least one link and at least one node. The method comprises assigning each of the circuits to an optical signal, based on first and second criteria, and configuring the nodes based on the assignment.

In accordance with the present disclosure, another method of configuring a WDM network is presented. The WDM network includes circuits that carry optical signals, with each signal corresponding to a wavelength. The WDM network includes nodes, with links connecting the nodes to one another. Each circuit includes at least one link and at least one node. The method comprises generating a conflict graph that includes vertices, with edges connecting the vertices; associating each circuit with a vertex; assigning a subgroup of optical signals to a vertex; prioritizing each optical signal within the subgroup; assigning each circuit to an optical signal based on the two previous steps; and configuring the nodes based on the assignment.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure.

DESCRIPTION OF THE EMBODIMENTS

Reference will now be made in detail to the present embodiments of the invention, an example of which is illustrated in the accompanying drawings. Wherever possible, the same reference numbers will be used throughout the drawings to refer to the same or like parts.

Consistent with the present disclosure, a method is provided for configuring a WDM network by assigning optical signals to circuits in the network based on first and second criteria and then configuring the nodes based on that assignment. In an initial step, the WDM network may be modeled with a diagram displaying the nodes, circuits, links, and available wavelengths for each link in the WDM network. Then, in a subsequent step, a conflict graph is created based on the WDM network that includes vertices corresponding to circuits in the WDM network, edges corresponding to shared links in the WDM network, and wavelength lists corresponding to each vertex. The wavelength lists in the conflict graph should be sorted based on the priority of the wavelengths in the network. In a later step, an algorithm, such as a greedy heuristic algorithm, may be applied to the conflict graph in order to assign wavelengths to each circuit in the network. The nodes are then configured within the network based on the assignment of wavelengths from the third step.

Figure 1:
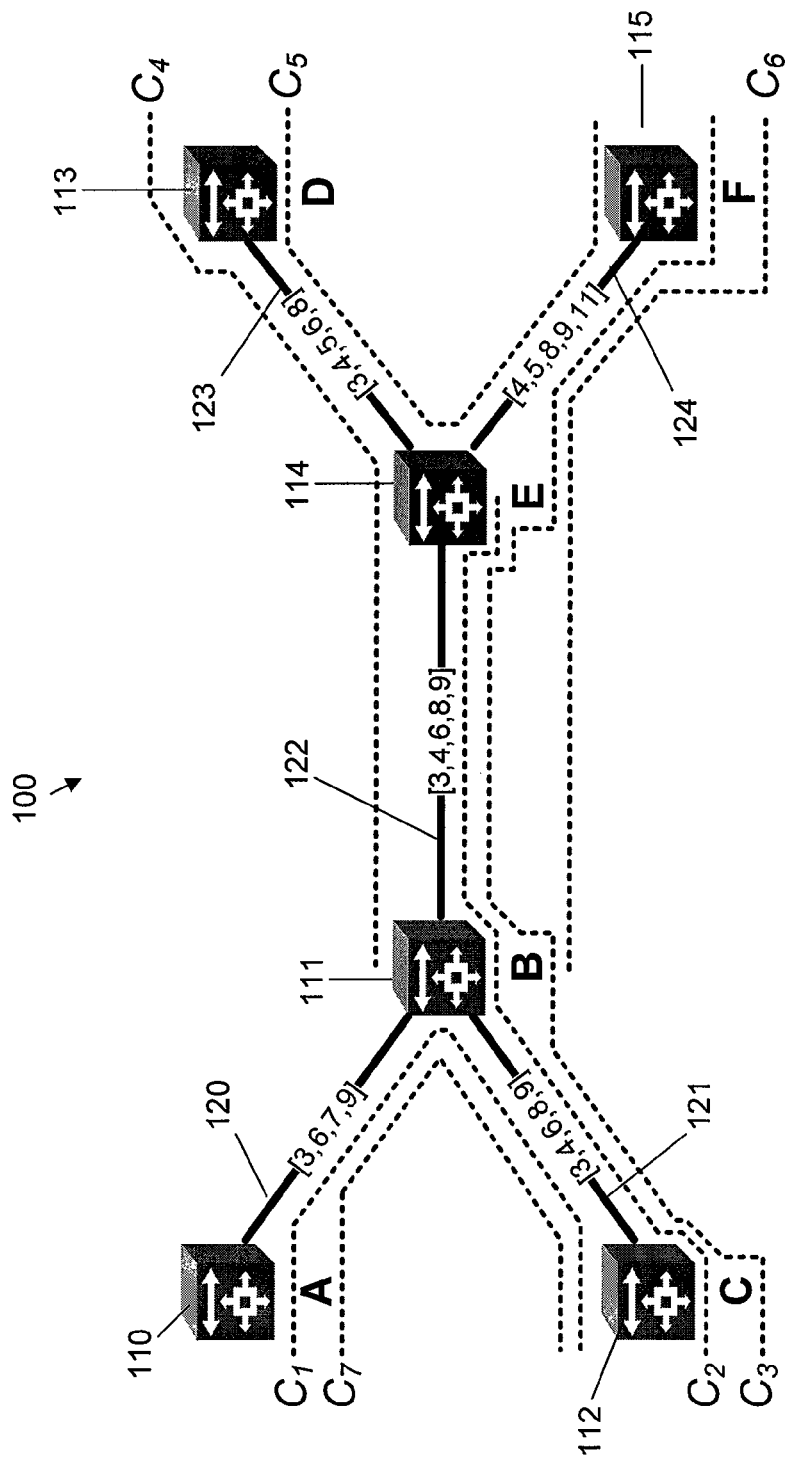
FIG. 1 is a diagram of a WDM network including optically switched nodes.

FIG. 1 illustrates a diagram of an exemplary WDM network 100 including several nodes 110-115. Each node is connected to at least one other node by one of links 120-124. For example, node 110 is connected to node 111 by link 120, and node 111 is connected to node 112 by link 121. In addition, node 111 is connected to node 114 by link 122, and node 114 is connected to node 113 by link 123. Further, node 114 is connected to node 115 by link 124.

Typically, there are a limited number of wavelengths on each link that can be allocated to a given optical signal transmitted on a circuit. Although networking equipment can be designed to operate with a wide range of wavelengths, the wavelengths actually available in a link within a network may be constrained to a subset of the set of wavelengths supported by the equipment due to such things as the type and quality of the deployed optical fibers, available amplification sites, and the types of amplifiers used. In addition, when wavelengths need to be allocated to a set of circuits, the network may be already deployed and some wavelengths may already be allocated to circuits that were previously provisioned.

In WDM network 100, the wavelengths available for allocation on link 120 include wavelengths $\lambda_3$, $\lambda_6$, $\lambda_7$, and $\lambda_9$, and the wavelengths available for allocation on link 121 include wavelengths $\lambda_3$, $\lambda_4$, $\lambda_6$, $\lambda_8$, and $\lambda_9$. In addition, the wavelengths available for allocation on link 122 include wavelengths $\lambda_3$, $\lambda_4$, $\lambda_6$, $\lambda_8$, and $\lambda_9$, and the wavelengths available for allocation on link 123 include wavelengths $\lambda_3$, $\lambda_4$, $\lambda_5$, $\lambda_6$, and $\lambda_8$. Further, the wavelengths available for allocation on link 124 include wavelengths $\lambda_4$, $\lambda_5$, $\lambda_8$, $\lambda_9$, and $\lambda_{11}$.

Within WDM network 100, several circuits $C_1$-$C_7$ are illustrated, with each circuit including one or more links 120-124: circuit $C_1$ includes links 120 and 121; circuit $C_2$ includes links 121 and 122; circuit $C_3$ includes links 121, 122, and 124; circuit $C_4$ includes links 122 and 123; circuit $C_5$ includes links 123 and 124; circuit $C_6$ includes links 122 and 124; and circuit $C_7$ includes links 120 and 121.

Figure 2:
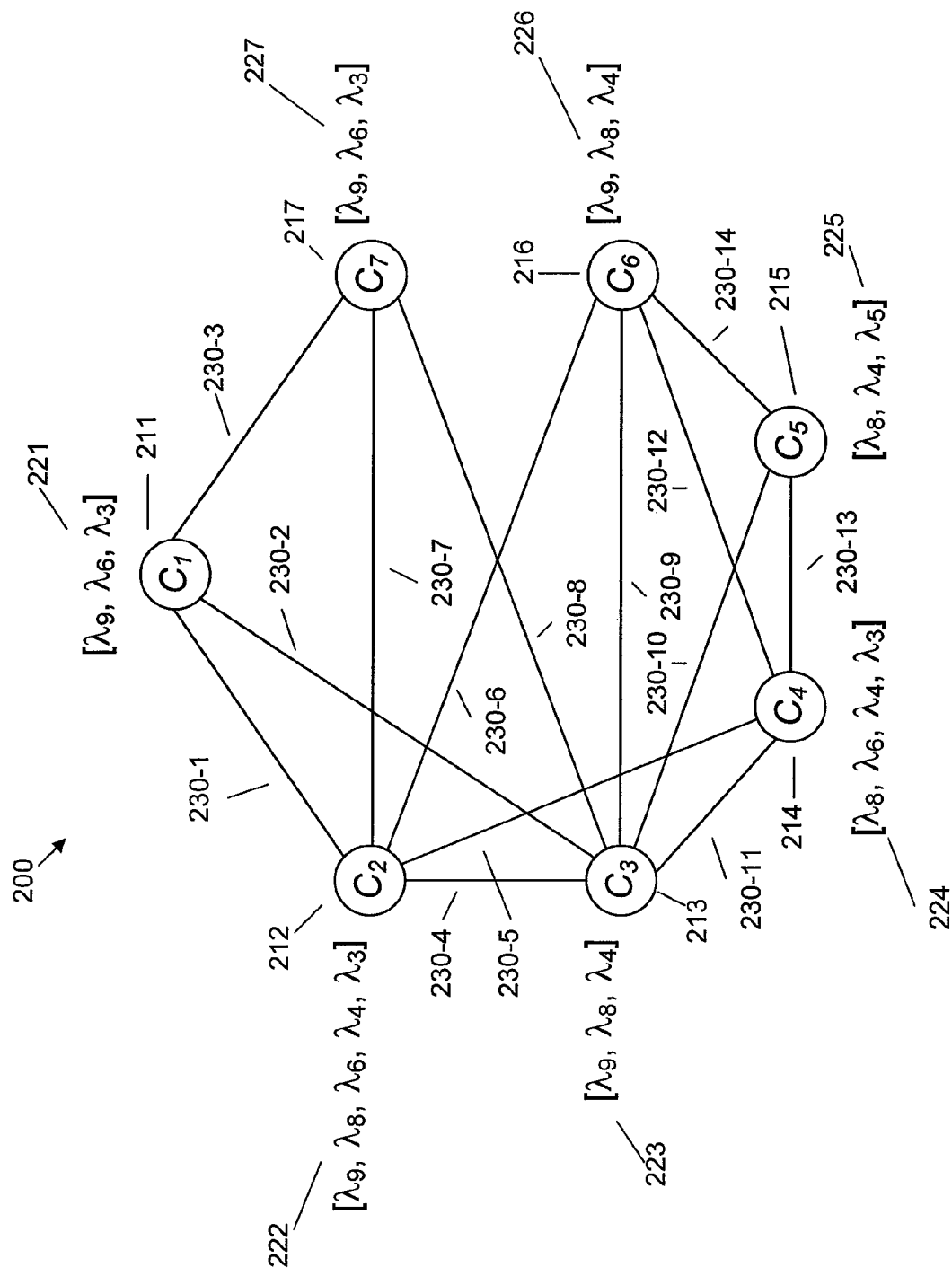
FIG. 2 is a diagram of a conflict graph consistent with an aspect of the present disclosure.

FIG. 2 illustrates an exemplary conflict graph 200 that may be used to model WDM network 100 from FIG. 1 and to aid in the determination of which available wavelength should be assigned to each circuit $C_1$-$C_7$ from FIG. 1. Conflict graph 200 includes vertices 211-217 that represent circuits $C_1$-$C_7$ from FIG. 1, respectively. Wavelength lists 221-227 are displayed next to vertices 211-217. Each wavelength list 221-227 corresponds to the wavelengths available for each circuit $C_1$-$C_7$, respectively. The wavelengths available for a given circuit are those wavelengths that are available on all of the links included within a circuit. For example, for circuit $C_1$, which traverses links 120 and 121, the wavelengths that are available are wavelengths $\lambda_3$, $\lambda_6$, and $\lambda_9$, because those are the wavelengths that are available on both links 120 and 121.

The wavelength lists 221-227 are each sorted based on the priority associated with each wavelength in the network. A network designer may prioritize certain wavelengths if, for example, the designer has spare line system equipment operating in those wavelengths that could be used in an upcoming network buildout or if there is a lower expense for equipment supporting certain wavelengths. Similarly, an equipment manufacturer designing a network for a customer may have a preference for equipment supporting certain wavelengths that it already has in stock, rather than for equipment supporting other wavelengths that it does not have in stock or that has yet to be manufactured. In the example shown in FIG. 2, the wavelength lists 221-227 were sorted based on the following priority (those listed first having the higher priority): $\lambda_9$, $\lambda_8$, $\lambda_6$, $\lambda_4$, $\lambda_5$, $\lambda_3$.

In the conflict graph 200, edges 230-1 through 230-14 are shown connecting vertices 211-217 when the corresponding circuits $C_1$-$C_7$ share at least one link. For example, circuit $C_1$ shares at least one link with circuits $C_2$, $C_3$, and $C_7$, so edges 230-1, 230-2, and 230-3 are drawn connecting vertex 211 with vertices 212, 213, and 217 (corresponding to circuits $C_1$, $C_2$, $C_3$, and $C_7$). In assigning a wavelength to a vertex (and its corresponding circuit), the wavelength is chosen from its corresponding list of available wavelengths, provided that the same wavelength is not assigned to vertices connected by an edge.

After a conflict graph has been created, different known algorithms, such as exhaustive enumeration and greedy heuristics can be used to determine the assignment of wavelengths. One advantage of using an exhaustive enumeration algorithm is that if there are multiple solutions to the assignment of wavelengths for a conflict graph, then this algorithm will determine all such solutions. One disadvantage of using the exhaustive enumeration algorithm is that this algorithm potentially requires more computation than the greedy heuristics algorithm. An example of a greedy heuristic algorithm is a "Largest First, First Fit (LF+FF)" algorithm in which the vertices of the conflict graph are first sorted in a "Largest First" list in descending order according to the number of edges connected to each vertex. To the extent that some of the vertices have the same number of edges, the vertices can be further sorted in descending order in the "Largest First" list according to the length of their corresponding wavelength lists (with shorter wavelength lists receiving higher priority), or they can be further sorted according to the "rarity" of the wavelengths in the wavelength lists (with the set of "rarer" wavelengths receiving higher priority). After the ordering is defined in the "Largest Fit" list, a wavelength is assigned to each vertex by using "First Fit." "First Fit" means that, for a given vertex, a "fit" is attempted for each wavelength in its wavelength list in the order that it appears in the list until a "fitting" wavelength is found (i.e., a wavelength that is not used by any of the vertices that are connected by an edge to the given vertex). Once a "fitting" wavelength is found, it is assigned to the vertex.

By way of example, to create the "Largest First" list for the conflict graph 200 in FIG. 2, the number of edges 230-1 through 230-14 connected to each vertex must be determined. As can be seen in FIG. 2, vertex 213 has 6 connected edges, vertex 212 has 5 connected edges, vertices 214 and 216 each have 4 connected edges, and vertices 211, 215, and 217 each have 3 connected edges. Based solely on the number of edges, an initial "Largest Fit" ordering could be: 213, 212, 214, 216, 211, 215, and 217. Because the foregoing list includes some vertices with the same number of edges, the list may be further sorted based on the length of corresponding wavelength lists. While vertices 214 and 216 have the same number of edges, the wavelength list 224 corresponding to vertex 214 contains 4 wavelengths, while the wavelength list 226 corresponding to vertex 216 contains only 3 wavelengths. Due to the lower number of wavelengths contained in the wavelength list corresponding to vertex 216, vertex 216 may be ranked higher than vertex 214. Vertices 211, 215, and 217 all have the same number of edges and the same number of wavelengths in their corresponding wavelength lists. These vertices can thus be sorted according to the "rarity" of the wavelengths in their corresponding wavelength lists (with the "rarer" wavelength lists receiving higher priority). Accordingly, for example, in the wavelength list corresponding to vertex 215, which includes wavelengths $\lambda_8$, $\lambda_4$, and $\lambda_5$, wavelengths $\lambda_8$ and $\lambda_4$ each appear 5 times in the conflict graph 200, and wavelength 5 appears once, for a total "rarity" score of 11 (5+5+1). The wavelength lists corresponding to both vertex 211 and 217 includes wavelengths $\lambda_9$, $\lambda_6$, and $\lambda_3$. Thus, wavelengths $\lambda_6$ and $\lambda_3$ each appear 4 times in the conflict graph 200, and wavelength $\lambda_9$ appears 5 times, for a total "rarity" score of 13 (4+4+5). Because the "rarer" wavelength list receives higher priority (the list with the lower "rarity" score), vertex 215 is ranked higher than vertices 211 and 217. Based on the foregoing, the "Largest Fit" list can be ordered as follows (also showing the corresponding wavelength lists):

Vertex 213: $\lambda_9$, $\lambda_8$, $\lambda_4$
Vertex 212: $\lambda_9$, $\lambda_8$, $\lambda_6$, $\lambda_4$, $\lambda_3$
Vertex 216: $\lambda_9$, $\lambda_8$, $\lambda_4$
Vertex 214: $\lambda_8$, $\lambda_6$, $\lambda_4$, $\lambda_3$
Vertex 215: $\lambda_8$, $\lambda_5$, $\lambda_4$
Vertex 211: $\lambda_9$, $\lambda_6$, $\lambda_3$
Vertex 217: $\lambda_9$, $\lambda_6$, $\lambda_3$ Once the "Largest Fit" list is created, the "First Fit" algorithm can be applied to the list. Beginning with vertex 213, the first wavelength in the list ($\lambda_9$) can be assigned, because no other wavelengths have yet been assigned (so nothing can conflict with this assignment). For vertex 212, the first wavelength in the list ($\lambda_9$) cannot be assigned, because vertex 212 shares an edge 230-4 with vertex 213, and vertex 213 is already using wavelength $\lambda_9$; however, the second wavelength in the list ($\lambda_8$) can be assigned. For vertex 216, neither the first nor second wavelength in the list ($\lambda_9$, $\lambda_8$) can be assigned, because they are already assigned to vertices 213 and 212, which both share an edge with vertex 216; however, the last wavelength in the list ($\lambda_4$) can be assigned. For vertex 214, the first wavelength in the list ($\lambda_8$) can not be assigned, because vertex 214 shares an edge 230-5 with vertex 212, and vertex 212 is already using wavelength $\lambda_8$; however, the second wavelength in the list ($\lambda_6$) can be assigned. For vertex 215, the first wavelength in the list ($\lambda_8$) can be assigned, because even though vertex 212 was already assigned wavelength $\lambda_8$, vertex 215 does not share an edge with vertex 212. For vertex 211, the first wavelength in the list ($\lambda_9$) cannot be assigned, because vertex 211 shares an edge 230-2 with vertex 213, and vertex 213 is already using wavelength $\lambda_9$; however, the second wavelength in the list ($\lambda_6$) can be assigned. For vertex 217, the first wavelength in the list ($\lambda_9$) can not be assigned, because vertex 217 shares an edge 230-8 with vertex 213, and vertex 213 is already using wavelength $\lambda$ g; the second wavelength in the list ($\lambda_6$) can not be assigned, because vertex 217 shares an edge 230-3 with vertex 211, and vertex 211 is already using wavelength 6; however, the third wavelength in the list ($\lambda_3$) can be assigned. Thus, of the following wavelength assignments can be obtained in the example shown in FIG. 2:

Vertex 213: $\lambda_9$
Vertex 212: $\lambda_8$
Vertex 216: $\lambda_4$
Vertex 214: $\lambda_6$
Vertex 215: $\lambda_8$
Vertex 211: $\lambda_6$
Vertex 217: $\lambda_3$ After determining the wavelength assignment for each circuit in the network as described above, the nodes within the network are then configured based on that assignment.

Figure 3:
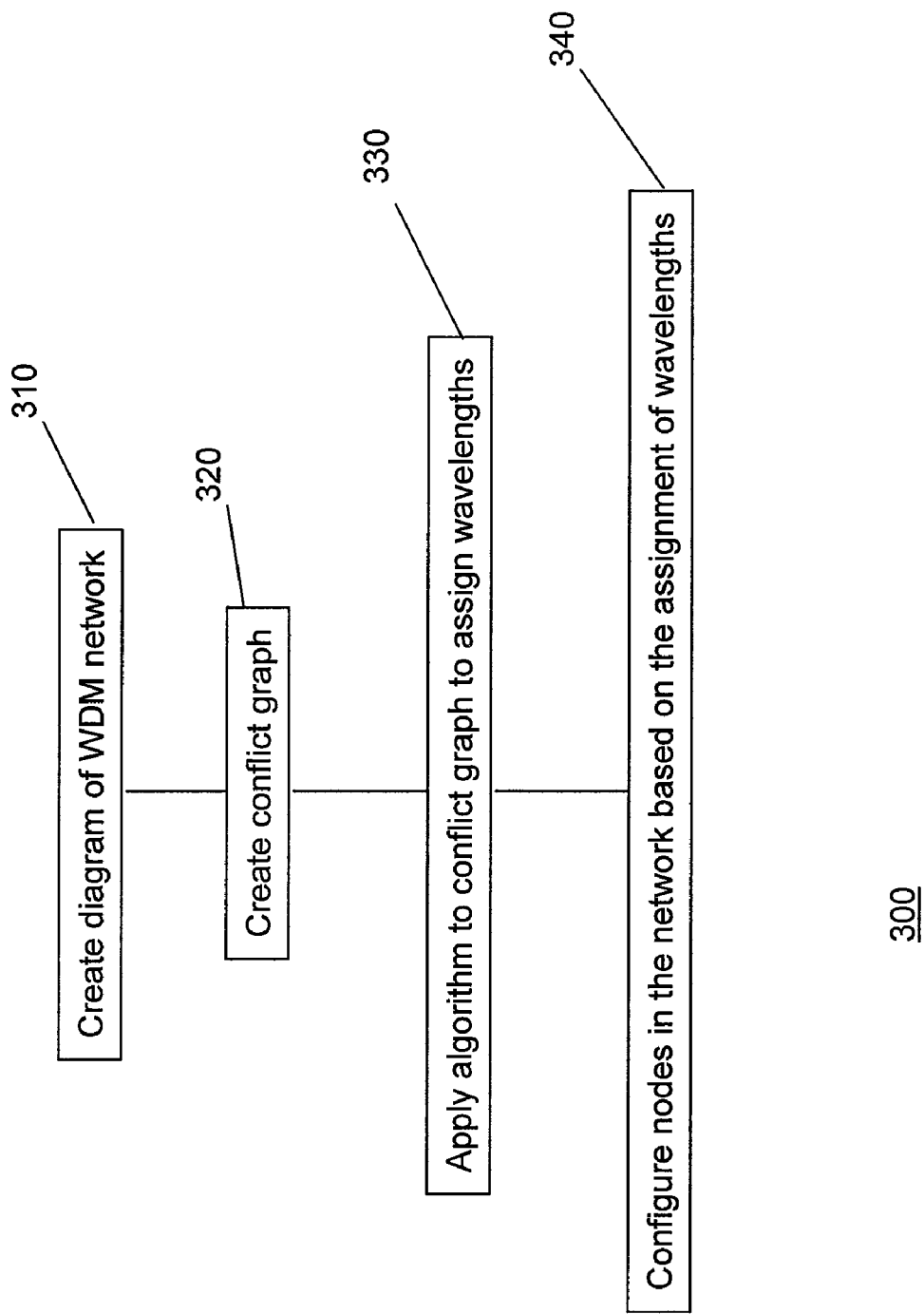
FIG. 3 is illustrates an embodiment of the steps in configuring a WDM network.

Flowchart 300 in FIG. 3 shows the steps included in a method of configuring a WDM network consistent with the present disclosure. In a first step 310, a diagram of a WDM network 100 may be created. The diagram preferably includes the nodes, circuits, links, and available wavelengths for each link in the WDM network. In a second step 320, a conflict graph 200 is created. The conflict graph preferably include vertices corresponding to the circuits in the WDM network, edges corresponding to shared links in the WDM network, and wavelength lists corresponding to each vertex. The wavelength lists are sorted based on the priority of the wavelengths in the network. In a third step 330, an algorithm, such as a greedy heuristic algorithm, is applied in order to assign wavelengths to each circuit in the WDM network. One example of a greedy heuristic that can be used is a modified "Largest First, First Fit" algorithm. In a fourth step 340, the nodes within the network are configured based on the assignment of the wavelengths to each circuit in the network.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of configuring a wavelength division multiplexed (WDM) network, the WDM network including a plurality of circuits, each of which carrying one of a plurality of optical signals, each of the plurality of optical signals having a corresponding one of a plurality of wavelengths, the WDM network including a plurality of nodes and a plurality of links connecting the plurality of nodes to one another, each of the plurality of circuits including at least one of the plurality of links and at least one of the plurality of nodes, the method comprising:
    generating a conflict graph, the conflict graph including a plurality of vertices and a plurality of edges connecting the plurality of vertices;
    associating each of the plurality of circuits with a corresponding one of the plurality of the plurality of vertices;
    assigning each of a plurality of subgroups of the plurality of optical signals to a corresponding one of the plurality of vertices;
    prioritizing each optical signal within each of the plurality of subgroups of optical signals;
    assigning each of the plurality of circuits one of the plurality of optical signals, based on said step of prioritizing said each optical signal within each of the plurality of subgroups and said step of assigning said each of the plurality of subgroups; and
    configuring the plurality of nodes based on the assigning each of the plurality of circuits one of the plurality of optical signals.

2. A method in accordance with claim 1, wherein the assigning said each of the plurality of subgroups of the plurality of optical signals is based on a first criteria, and the assigning said each of the plurality of circuits is based on a second criteria.

3. A method in accordance with claim 2, wherein the first criteria includes an availability of each of the plurality of optical signals and the second criteria includes a priority associated with each of the plurality of wavelengths, the priority being based on at least one of expense of equipment supporting each of the plurality of wavelengths and physical properties associated with each of the plurality of links.

4. A method in accordance with claim 1, wherein each of the plurality of links includes an optical fiber.

5. A method in accordance with claim 1, further including ranking each of the plurality of circuits in accordance with a greedy heuristic algorithm.

6. A method in accordance with claim 5, wherein the greedy heuristic algorithm includes a "Largest First, First Fit" algorithm.

7. A method in accordance with claim 1, wherein each of the plurality of nodes includes an optical switch.

8. A method in accordance with claim 7, wherein the optical switch is configured to pass light without an optical-to-electrical conversion.

9. A method in accordance with claim 1, wherein the conflict graph includes a plurality of edges, each of the plurality of edges linking pairs of the plurality of vertices, each of said pairs corresponding to pairs of the plurality of circuits that share one of the plurality of links.

10. A method in accordance with claim 1, further including ranking each of the plurality of circuits in accordance with an exhaustive enumeration algorithm.

* * * * *